United States Patent [19]

(12) United States Patent
Takagi

(10) Patent No.: US 7,884,952 B2
(45) Date of Patent: Feb. 8, 2011

(54) PRINT CONTROL APPARATUS, PRINT CONTROL METHOD, AND PROGRAM FOR IMPLEMENTING THE METHOD

(75) Inventor: Yoshihiro Takagi, Yokohama (JP)

(73) Assignee: Canon Kabushiki Kaisha (JP)

( * ) Notice: Subject to any disclaimer, the term of this patent is extended or adjusted under 35 U.S.C. 154(b) by 1346 days.

(21) Appl. No.: 11/397,007

(22) Filed: Apr. 3, 2006

(65) Prior Publication Data

US 2006/0221361 A1  Oct. 5, 2006

(30) Foreign Application Priority Data

Apr. 4, 2005  (JP)  ............... 2005-107919

(51) Int. Cl.
*G06F 3/12*  (2006.01)
(52) U.S. Cl. .................. 358/1.1; 358/1.9; 358/1.15
(58) Field of Classification Search .................. 358/1.1, 358/1.15, 1.13, 1.9
See application file for complete search history.

(56) References Cited

U.S. PATENT DOCUMENTS 6,874,034 B1 * 3/2005 Hertling .................. 709/245

2003/0079063 A1 * 4/2003 Iida et al. .................. 710/8

FOREIGN PATENT DOCUMENTS

JP  2003-091387 A  3/2003

* cited by examiner

*Primary Examiner*—King Y Poon
*Assistant Examiner*—Iriana Cruz
(74) *Attorney, Agent, or Firm*—Rossi, Kimms & McDowell LLP

(57) ABSTRACT

A print control apparatus that can improve the performance and quality of a printer driver and a Win32 application and can improve usability for users. A Win32 application that operates on the print control apparatus handles print settings as a print ticket in XML format, and a printer driver that operates on the apparatus manages print settings as a DEVMODE structure in binary format. A conversion process between the print ticket and the DEVMODE structure is carried out in a submodule. The submodule constructs a public portion of the DEVMODE structure based on the print ticket and incorporates the print ticket into a free space in a private portion of the DEVMODE structure. Further, the submodule extracts the print ticket incorporated in the DEVMODE private portion.

13 Claims, 12 Drawing Sheets

```
                    ┌ WCHAR  dmDeviceName[CCHDEVICENAME];
DEVMODE             │ WORD   dmSpecVersion;
PUBLIC              │ WORD   dmDriverVersion;
PORTION1110         │ WORD   dmSize;
                    │ WORD   dmDriverExtra;
                    │ ... OMISSION...
                    │ short  dmPaperLength;
                    │ short  dmPaperWidth;
                    │ short  dmScale;
                    │ short  dmCopies;
                    │ ... OMISSION...
                    │ DWORD  dmPanningWidth;
DEVMODE             └ DWORD  dmPanningHeight;
PRIVATE             ┌ SIGNATURE ─────────── 1101
PORTION 1120        │ PRINT TICKET PRIORITY FLAG ──── 1102
                    └ PRINT TICKET COMPRESSION FLAG ── 1103

┌ <?xml version="1.0" encoding="UTF-8=" ?>
                    │ <JobTicket
                    │ xmlns:xsi="http://www.w3.org/2001/XMLSche
                    │ ma-instance"
                    │ ... OMISSION...
PRINT               │ xmlns:psk="http://schemas.microsoft.com/w
TICKET1130          │ indows/2003/08/printing/printschemakeywor
                    │ ds">
                    │ <psf:Feature name="psk:DocumentCollate">
                    │ <psf:Option name="psk:Collated" />
                    │ </psf:Feature>
                    │ ... OMISSION...
                    └ </JobTicket>
```

FIG. 4

| | |
|---|---|
| DEVMODE PUBLIC PORTION 1110 | WCHAR  dmDeviceName[CCHDEVICENAME];<br>WORD    dmSpecVersion;<br>WORD    dmDriverVersion;<br>WORD    dmSize;<br>WORD    dmDriverExtra;<br>... OMISSION ...<br>short     dmPaperLength;<br>short     dmPaperWidth;<br>short     dmScale;<br>short     dmCopies;<br>... OMISSION ...<br>DWORD  dmPanningWidth;<br>DWORD  dmPanningHeight; |
| DEVMODE PRIVATE PORTION 1120 | SIGNATURE ──────── 1101<br>PRINT TICKET PRIORITY FLAG ──── 1102<br>PRINT TICKET COMPRESSION FLAG ── 1103 |
| PRINT TICKET 1130 | <?xml version="1.0" encoding="UTF-8=" ?><br><JobTicket<br>xmlns:xsi="http://www.w3.org/2001/XMLSchema-instance"<br>... OMISSION ...<br>xmlns:psk="http://schemas.microsoft.com/windows/2003/08/printing/printschemakeywords"><br><psf:Feature name="psk:DocumentCollate"><br><psf:Option name="psk:Collated" /><br></psf:Feature><br>... OMISSION ...<br></JobTicket> |

FIG. 9

```
typedef struct_devicemode {
    TCHAR   dmDeviceName[32];
    WORD    dmSpecVersion;
    WORD    dmDriverVersion;
    WORD    dmSize;
    WORD    dmDriverExtra;
    DWORD   dmFields;
    short   dmOrientation;
    short   dmPapersize;
    short   dmPaperLength;
    short   dmPaperWidth;
    short   dmScale;
    short   dmCopies;
    short   dmDefaultSource;
    short   dmPrintQuality;
    short   dmColor;
    short   dmDuplex;
    short   dmYResolution;
    short   dmTTOption;
    short   dmCollate;
    TCHAR   dmFormName[32];
    WORD    dmUnusedPadding;
    USHORT  dmBitsPerPel;
    DWORD   dmPelsWidth;
    DWORD   dmPelsHeight;
    DWORD   dmDisplayFlags;
    DWORD   dmDisplayFrequency;
} DEVMODE;
```

FIG. 12

```xml
<?xml version="1.0" encoding="UTF-8" ?>
<JobTicket xmlns:xsi="http://www.w3.org/2001/XMLSchema-instance"
xmlns:xsd="http://www.w3.org/2001/XMLSchema"
xmlns="http://schemas.microsoft.com/windows/2003/08/printing/printschemaframework"
version="1"
xmlns:psf="http://schemas.microsoft.com/windows/2003/08/printing/printschemaframework"
xmlns:psk="http://schemas.microsoft.com/windows/2003/08/printing/printschemakeywords">
<psf:ParameterInit name="psk:DevmodeSnapshot">
<psf:Value>43006100 6E006F00 6E006E0... 中略 ...00</psf:Value>
</psf:ParameterInit>
<psf:Feature name="psk:DocumentCollate">
<psf:Option name="psk:Collated" />
</psf:Feature>
中略...
</JobTicket>
```

700

PRINT CONTROL APPARATUS, PRINT CONTROL METHOD, AND PROGRAM FOR IMPLEMENTING THE METHOD

BACKGROUND OF THE INVENTION

1. Field of the Invention

The present invention relates to a print control apparatus, a print control method, and a program for implementing the method, and more particularly, to a print control apparatus on which operate an application that handles print settings as a print ticket in XML format and a printer driver that manages the print settings as a print settings structure in binary format, a print control method applied to the print control apparatus, and a program for causing a computer to execute the print control method.

2. Description of the Related Art

In a printing environment in the Microsoft Windows (registered trademark) OS (operating system) developed by Microsoft Inc., a memory block called a "DEVMODE" structure used by Win32 applications serves an important role as print settings designating data. DEVMODE is the structure of designation information used when actually instructing a printer to carry out printing. In the Windows OS, DEVMODE provided by the OS stores the content of setting entered on the properties of a printer driver. DEVMODE is referred to by the printer driver that has been handed print data when generating print instructions to be transmitted to the printer.

FIG. 8 is a diagram showing the overall structure of the DEVMODE structure.

The DEVMODE structure is composed of a memory region that stores information relating to device initialization and a printer environment and is characterized by being composed of two regions, a public portion 301 whose specification is made public and a private portion 302 whose specification is not made public and can be accessed by the printer driver only. Normally, only extremely basic information such as sheet type, sheet orientation, resolution, and the like is written as members in the public portion 301 of the DEVMODE structure, with the remaining majority of the information being written as members in the private portion 302.

FIG. 9 is a diagram showing the structure of the public portion 301 of the DEVMODE structure shown in FIG. 8.

In FIG. 9, the "dmDeviceName" member specifies the name of a device supported by the printer driver.

The "dmSpecVersion" member specifies the version number of the initialization data specification on which the DEVMODE structure is based.

The "dmDriverVersion" member specifies the printer driver version number assigned by the developer of the printer driver.

The "dmSize" member specifies the size, in bytes, of the DEVMODE structure not including a "dmDriverData" member (device-specific information).

The "dmDriverExtra" member contains the number of bytes of private driver data that follow the DEVMODE structure.

The "dmFields" member specifies members that have been initialized out of the remaining members of the DEVMODE structure.

The "dmOrientation" member specifies the orientation of the sheet to be printed upon.

The "dmPaperSize" member specifies the size of the sheet to be printed upon.

The "dmPaperLength" member specifies the length of the sheet to be printed upon.

The "dmPaperWidth" member specifies the width of the sheet to be printed upon.

The "dmScale" member specifies the factor by which the printed output is to be scaled when scaling is carried out.

The "dmCopies" member specifies the number of copies printed if the device supports multiple-page copies.

The "dmDefaultSource" member specifies the paper source.

The "dmPrintQuality" member specifies the printer resolution.

The "dmColor" member switches between color and monochrome on color printers.

The "dmDuplex" member specifies "duplex" or double-sided printing for printers capable of double-sided printing.

The "dmYResolution" member specifies the y-resolution, in dots per inch, of the printer.

The "dmTTOption" member specifies how TrueType (registered trademark) fonts should be printed.

The "dmCollate" member specifies whether collation (i.e., sorting into page order) should be used when printing multiple copies.

The "dmFormName" member specifies the name of the form to be used.

The "dmUnusedPadding" member is used to align the DEVMODE structure to a DWORD boundary.

The "dmBitsPerPel" member specifies the color resolution, in bits per pixel, of the display device.

The "dmPelsWidth" member specifies the width, in pixels, of the visible device surface.

The "dmPelsHeight" member specifies the height, in pixels, of the visible device surface.

The "dmDisplayFlags" member specifies the display mode of the device.

The "dmDisplayFrequency" member specifies the frequency, in hertz, of the display device in a particular mode.

In this way, the public portion 301 of the DEVMODE structure is strictly defined by Microsoft as a header file written in C language. On the other hand, the private portion 302 of the DEVMODE structure that is independently defined by a printer driver developer continues immediately after the public portion 301 in the DEVMODE structure and has a size designated by the "dmDriverExtra" member.

In 2004, the hardware engineering conference "WinHEC 2004" was held by Microsoft in Seattle, USA. At the conference, it was announced that XML-based print settings designating data called a "print ticket" (also referred to in general terms as a "job ticket") would be used in Microsoft's next generation printing system.

DEVMODE, which is comprised of conventional print settings designating data, is written as a data structure. Since the specification of the private portion 302 that occupies the majority of DEVMODE can be freely decided by respective printer vendors, the content of the private portion 302 differs between vendors and is not made public. Also, since data of DEVMODE is binary data, users cannot understand the settings even if they refer to the content of DEVMODE. The private portion 302 of DEVMODE is characterized by being accessible only to a printer driver and in that a Win32 application including an API (Application Programming Interface) that is independent of the printer driver can use the data of DEVMODE (for example, data related to appliance-specific settings that is normally written in the private portion 302 of DEVMODE, such a stapling position and a face up/down setting for the discharged sheets) by communicating with the printer driver using the independent API. A technique by which an application acquires the data of DEVMODE from a printer driver is disclosed in Japanese Laid-Open Patent Publication (Kokai) No. 2003-091387, for example.

On the other hand, a print ticket that is comprised of print settings designating data with the new format has the following five characteristics: (i) the ticket is written in XML (Extensible Markup Language); (ii) the specification of the ticket is made public; (iii) the ticket is written in text format (i.e., readable by the user); (iv) the ticket cannot be directly accessed by a printer driver; and (v) the ticket can be used from a WinFX application with a new-format API.

As described above, although it is a large step forward for a WinFX application to be able to use a print ticket, this only applies to an application layer and the situation is greatly different on a driver layer. This will now be described with reference to FIG. 10.

FIG. 10 is a diagram showing how print settings designating data of DEVMODE and a print ticket are transferred between the application layer, an OS layer, and the driver layer.

In FIG. 10, a Win32 application on the application layer communicates using DEVMODE with a printer driver 501 via a Win32 API on the OS layer.

On the other hand, a process by which a WinFX application on the application layer communicates using print tickets with the printer driver 501 on the driver layer via a WinFX API on the OS layer is quite complex. That is, according to the Microsoft specification, input and output for the printer driver 501 are limited to DEVMODE. This means that to make the printer driver 501 compatible with print tickets, it is necessary to provide the driver layer with a submodule 502 for converting between print tickets and DEVMODE. Due to the functioning of the submodule 502, even though the printer driver 501 is able to handle only DEVMODE, it is possible to have communication carried out between the printer driver 501 and the WinFX application using in effect print tickets.

As shown in FIG. 10, to maintain compatibility with the specification of the conventional Win32 application, as before the printer driver 501 needs to handle DEVMODE comprised of the print settings designating data that is described in non-public binary format. Since the exchanging of print settings with the Win32 application is carried out using conventional DEVMODE, the printer driver can handle the settings without conversion. However, to exchange print settings with the WinFX application, a conversion process (referred to hereinafter as a "ticket cycle") between a print ticket and DEVMODE has to be frequently carried out. The ticket cycle has a problem that will now be described with reference to FIG. 11.

FIG. 11 is a diagram showing the ticket cycle executed by the submodule 502. When the WinFX application produces a print ticket, the print ticket is converted to DEVMODE by the submodule 502 and the converted DEVMODE is received by the printer driver. Print settings made via the printer driver UI (User Interface) are managed using DEVMODE. On the other hand, when the print settings are passed over to the WinFX application, the printer driver has the DEVMODE converted to a print ticket by the submodule 502 and the converted print ticket is received by the WinFX application.

For this reason, if the ability of a print ticket to express print settings is lower than the ability of DEVMODE to express such settings, there will be a problem in that part of the information in the DEVMODE print settings designating data will be lost when the DEVMODE of the print settings made via the printer driver UI is converted (T1 in FIG. 11) to a print ticket to be passed over to the WinFX application.

To prevent data from being lost in this way, a method that incorporates DEVMODE into the print ticket is conceivable.

FIG. 12 is a diagram showing one example of a print ticket generated by a printer driver based on Microsoft's Unidrv. In the example in FIG. 12, DEVMODE 700 is incorporated inside the print ticket.

However, preventing the loss of data by incorporating DEVMODE in the print ticket in this way is based on a premise of DEVMODE having a greater ability to express print setting designations than the print ticket. When the print ticket has a greater ability to express print setting designations than DEVMODE, it is not possible to prevent data from being lost.

Also, as described above, it is still necessary for the printer driver 501 to handle the DEVMODE structure in order to maintain compatibility with the specification of conventional Win32 applications. For this reason, there have been a number of problems that inconvenience users, such as (i) the ticket cycle is complex and the processing speed is slow, (ii) there is an increased load for data management since it is necessary to manage both the print ticket and DEVMODE, (iii) in spite of the print ticket being based on XML, desired tags cannot be added easily, and (iv) since the size of DEVMODE is decided at a fixed value during initialization, content cannot be added later to DEVMODE.

Also, conventional Win32 applications are not able to access and directly read and write the private portion of the DEVMODE structure. Thus, as shown in FIG. 13, a printer driver 800 accesses a DEVMODE private portion 803 via a driver expansion interface (I/F) 801 that is uniquely designed for the printer driver 800. FIG. 13 shows the relationship between a Win32 application 802 and the driver expansion interface 801 of the printer driver 800 and the relationship between the driver expansion interface 801 and the DEVMODE private portion 803.

By using the driver expansion interface 801, the Win32 application 802 can access and read and write the DEVMODE private portion 803, and as a result, the Win32 application 802 can set original functions supported by the printer driver 800 (for example, a stapling function). The driver expansion interface 801 used by the Win32 application 802 is implemented in the printer driver 800 according to different methods by respective developers and therefore does not have general-purpose applicability (in other words, the interface 801 is incompatible with other drivers). Since the method of using the driver expansion interface 801 will differ if the type of printer driver 800 changes, components of the Win32 application 802 become extremely complex, thereby increasing the time and effort required by application development.

On the other hand, as shown in FIG. 14, a WinFX application 900 can directly access a print ticket 901 and read and write the print ticket 901 directly without performing access via a print driver. FIG. 14 is a diagram showing the relationship between the WinFX application 900 and the print ticket 901.

In this way, since the WinFX application 900 can directly access the print ticket 901, components of the WinFX application 900 become extremely simple.

However, the conventional Win32 application 802 described above cannot handle the print ticket 901 and can only use the DEVMODE private portion 803. In this case, it is necessary to depend on the driver expansion interface 801 that is uniquely designed for the printer driver 800, which has increased the time and effort required to develop Win32 applications.

SUMMARY OF THE INVENTION

It is an object of the present invention to provide a print control apparatus, a print control method, and a program for implementing the method that can improve the performance and quality of a printer driver and a Win32 application and can thereby improve usability for users.

To attain the above object, in a first aspect of the present invention, there is provided a print control apparatus on which operate an application that handles print settings as a print ticket in XML format and a printer driver that manages print settings as a print settings structure in binary format, the print control apparatus comprising a constructing device that constructs a public data portion of the print settings structure in binary format based on the print ticket in XML format, an incorporating device that incorporates the print ticket in XML format into a non-public data portion of the print settings structure in binary format, and an extracting device that extracts the print ticket in XML format incorporated in the non-public data portion of the print settings structure in binary format.

Preferably, the incorporating device includes an acquiring device that acquires a size of a free space in a memory region for storing the non-public data portion of the print settings structure in binary format, a first comparing device that compares the size of the free space acquired by the acquiring device and a size of the print ticket in XML format, and a compressing device operable when a comparison result of the first comparing device is that the size of the free space is smaller than the size of the print ticket in XML format, to compress the print ticket in XML format.

More preferably, the incorporating device includes a second comparing device that compares the size of the free space acquired by the acquiring device and a size of the print ticket in XML format compressed by the compressing device, and a first storage device operable when a comparison result of the second comparing device is that the size of the compressed print ticket in XML format is not greater than the size of the free space, to store the compressed print ticket in XML format in the free space in the memory region for storing the non-public data portion of the print settings structure in binary format.

Alternatively, the incorporating device includes a second storage device operable when a comparison result of the first comparing device is that the size of the free space is not less than the size of the print ticket in XML format, to store the print ticket in XML format in the free space in the memory region for storing the non-public data portion of the print settings structure in binary format.

Preferably, the incorporating device includes a canceling device operable when a comparison result of the second comparing device is that the size of the compressed print ticket in XML format is larger than the size of the free space, to cancel storage of the compressed print ticket in XML format in the free space in the memory region for storing the non-public data portion of the print settings structure in binary format.

Preferably, the extracting device includes a determining device that determines whether the print ticket in XML format incorporated in the free space in the memory region for storing the non-public data portion of the print settings structure in binary format is compressed, and a decompression device operable when the determining device has determined that the print ticket in XML format is compressed, to decompress the compressed print ticket in XML format.

Preferably, the print control apparatus further comprises a deciding device that decides which data is to be prioritized out of the print ticket in XML format and the public data portion of the print settings structure in binary format, a determining device operable when the deciding device has decided that the print ticket in XML format is to be prioritized, to determine whether a content of the print ticket in XML format differs to a content of the public data portion of the print settings structure in binary format, and a correcting device operable when the determining device has determined that the content of the print ticket in XML format differs from the content of the public data portion of the print settings structure in binary format, to correct the print ticket in XML format based on the content of the public data portion of the print settings structure in binary format.

To attain the above object, in a second aspect of the present invention, there is provided a print control method applied to a print control apparatus on which operate an application that handles print settings as a print ticket in XML format and a printer driver that manages print settings as a print settings structure in binary format, the print control method comprising a constructing step of constructing a public data portion of the print settings structure in binary format based on the print ticket in XML format, an incorporating step of incorporating the print ticket in XML format into a non-public data portion of the print settings structure in binary format, and an extracting step of extracting the print ticket in XML format incorporated in the non-public data portion of the print settings structure in binary format.

Preferably, the incorporating step includes an acquiring step of acquiring a size of a free space in a memory region for storing the non-public data portion of the print settings structure in binary format, a first comparing step of comparing the size of the free space acquired by the acquiring step and a size of the print ticket in XML format, and a compressing step of compressing the print ticket in XML format when a comparison result of the first comparing step is that the size of the free space is smaller than the size of the print ticket in XML format.

More preferably, the incorporating step includes a second comparing step of comparing the size of the free space acquired by the acquiring step and a size of the print ticket in XML format compressed by the compressing step, and a first storage step of storing the compressed print ticket in XML format in the free space in the memory region for storing the non-public data portion of the print settings structure in binary format when a comparison result of the second comparing step is that the size of the compressed print ticket in XML format is not greater than the size of the free space.

Alternatively, the incorporating step includes a second storage step of storing the print ticket in XML format in the free space in the memory region for storing the non-public data portion of the print settings structure in binary format when a comparison result of the first comparing step is that the size of the free space is not less than the size of the print ticket in XML format.

Preferably, the incorporating step includes a canceling step of canceling storage of the compressed print ticket in XML format in the free space in the memory region for storing the non-public data portion of the print settings structure in binary format when a comparison result of the second comparing step is that the size of the compressed print ticket in XML format is larger than the size of the free space.

Preferably, the extracting step includes a determining step of determining whether the print ticket in XML format incorporated in the free space in the memory region for storing the non-public data portion of the print settings structure in binary format is compressed, and a decompression step of decompressing the compressed print ticket in XML format when the determining step has determined that the print ticket in XML format is compressed.

Preferably, the print control method further comprises a deciding step of deciding which data is to be prioritized out of the print ticket in XML format and the public data portion of the print settings structure in binary format, a determining step of determining whether a content of the print ticket in XML format differs to a content of the public data portion of the print settings structure in binary format when the deciding step has decided that the print ticket in XML format is to be prioritized, and a correcting step of correcting the print ticket in XML format based on the content of public data portion of the print settings structure in binary format when the determining step has determined that the print ticket in XML format differs from the content of the public data portion of the print settings structure in binary format.

To attain the above object, in a third aspect of the present invention, there is provided a program for causing a computer to implement a print control method applied to a print control apparatus on which operate an application that handles print settings as a print ticket in XML format and a printer driver that manages print settings as a print settings structure in binary format, the program comprising a constructing module for constructing a public data portion of the print settings structure in binary format based on the print ticket in XML format, an incorporating module for incorporating the print ticket in XML format into a non-public data portion of the print settings structure in binary format, and an extracting module for extracting the print ticket in XML format incorporated in the non-public data portion of the print settings structure in binary format.

According to the present invention, there is no inclusive relationship between a print ticket in XML format and a print settings structure in binary format, and therefore even if a conversion process (ticket cycle) is executed between the print ticket and the print settings structure, no information is lost. Since the ticket cycle becomes extremely simple, the processing speed is increased. As a result, for example, high-speed printing becomes possible using a print ticket, even for Win32-based applications.

Thus, it is possible to improve the performance and quality of a printer driver and a Win32 application and thereby improve usability for users.

The above and other objects, features, and advantages of the invention will become more apparent from the following detailed description taken in conjunction with the accompanying with drawings.

BRIEF DESCRIPTION OF THE DRAWINGS

FIG. 4 is a diagram showing the structure of a DEVMODE structure according to the present embodiment;

FIG. 9 is a diagram showing the structure of a public portion of the DEVMODE structure shown in FIG. 8;

FIG. 12 is a diagram showing one example of a print ticket generated by a printer driver based on Microsoft's Unidrv;

DETAILED DESCRIPTION OF THE PREFERRED EMBODIMENTS

The present invention will now be described in detail with reference to the drawings showing preferred embodiments thereof.

Figure 1:
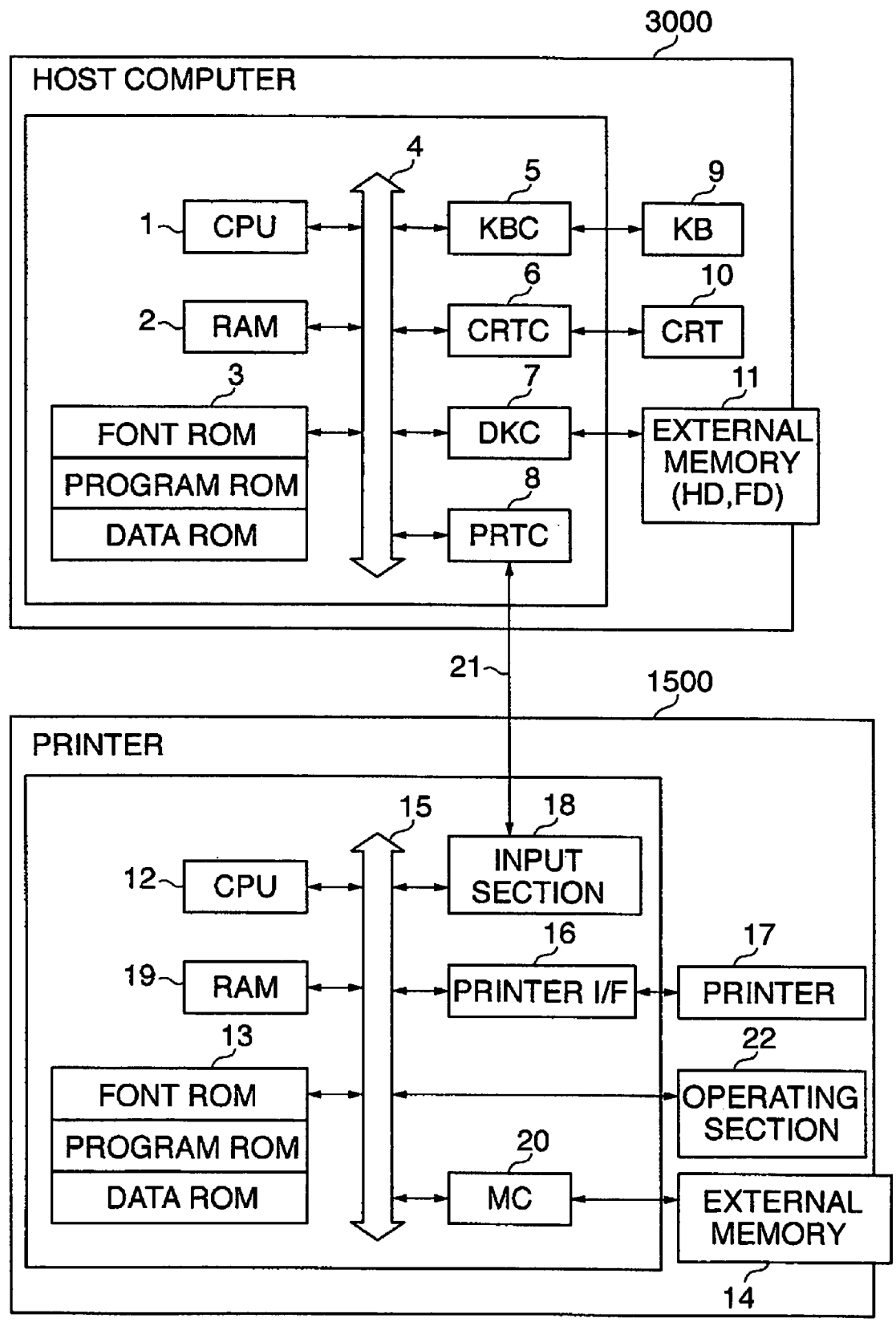
FIG. 1 is a block diagram showing the construction of a printer control system including a print control apparatus according to an embodiment of the present invention.

FIG. 1 is a block diagram showing the construction of a print system including a print control apparatus (host computer) according to an embodiment of the present invention.

In FIG. 1, reference numeral 3000 designates a host computer equipped with a CPU 1, a ROM 3, and an external memory 11. The CPU 1 processes documents, including ones containing graphics, images, text, tables (including spreadsheets) in a mixed manner, based on a document processing program or the like stored in a program ROM that constructs the ROM 3 or in the external memory 11. The CPU 1 also carries out overall control of various devices connected to a system bus 4.

An operating system program (hereinafter simply "OS") or the like that is a control program of the CPU 1 is stored in the program ROM of the ROM 3 or in the external memory 11. Font data or the like used when carrying out the document processing mentioned above is stored in a font ROM that constructs the ROM 3 or in the external memory 11. Various data used when carrying out the document processing is stored in a data ROM that constructs the ROM 3 or in the external memory 11.

The host computer 3000 is also comprised of a RAM 2, a keyboard controller (KBC) 5, a CRT controller (CRTC) 6, a disk controller (DKC) 7, a printer controller (PRTC) 8, a keyboard (KB) 9, and a CRT display (CRT) 10.

The RAM 2 functions as a main memory, a work area, and the like of the CPU 1. The keyboard controller 5 controls signal inputs from the keyboard 9 or a pointing device, not shown. The CRT controller 6 controls display of the CRT display 10. The disk controller 7 controls access to the external memory 11. The external memory 11 is a hard disk (HD), a floppy (registered trademark) disk (FD), or the like that stores a boot program, various applications, font data, user files, editing files, a printer control command generating program (hereinafter "printer driver"), and the like.

The printer controller 8 is connected to a printer 1500 via a predetermined two-way interface 21, and executes a communication control process to communicate with the printer 1500.

It should be noted that the CPU 1 rasterizes outline fonts onto a display information RAM provided e.g. on the RAM 2, for example, to enable WYSIWYG (What You See Is What You Get) on the CRT display 10.

The CPU 1 opens a variety of registered windows in response to commands designated by a mouse cursor or the like displayed on the CRT display 10, and executes various data processing. When the user carries out printing, a window relating to print settings is opened so that settings of a print processing method including settings of the printer 1500 and a selection of print mode can be made to the printer driver.

The printer 1500 is comprised of a CPU 12, a ROM 13, and an external memory 14. Based on a print control program stored in a program ROM that constructs the ROM 13 or the external memory 14, the CPU 12 outputs an image signal as output information to a print section (printer engine) 17 connected to a system bus 15.

A control program and the like of the CPU 12 are also stored in the program ROM of the ROM 13. Font data and the like used when generating the output information mentioned above are stored in a font ROM that constructs the ROM 13, and information and the like used at the host computer 3000 when the printer 1500 has no external memory such as a hard disk (HD) are stored in a data ROM that constructs the ROM 13.

In addition, the CPU 12 of the printer 1500 is capable of executing a communication process for communication with the host computer 3000 via an input section 18 so that the host computer 3000 can be notified of information and the like inside the printer 1500.

A RAM 19 functions as a main memory, a work area, and the like of the CPU 12 and is constructed so that the memory capacity can be expanded by an option RAM connected to an expansion port, not shown. Note that the RAM 19 is used as an output information expanding region, an environment data storage region, an NVRAM (non-volatile RAM), and the like.

The external memory 14 is constructed of a hard disk (HD), an IC card, or the like, with access to the external memory 14 being controlled by a memory controller (MC) 20. The external memory 14 is connected as an option and stores font data, an emulation program, form data, and the like. The printer 1500 may be provided with a plurality of external memories that store, in addition to the font data, optional font data and/or programs for interpreting printer control languages of different language systems.

An operation panel, switches, an LED display, and the like are arranged on an operating section 22.

Next, a typical example of print data generation by the host computer 3000 will be described with reference to FIG. 2.

Figure 2:
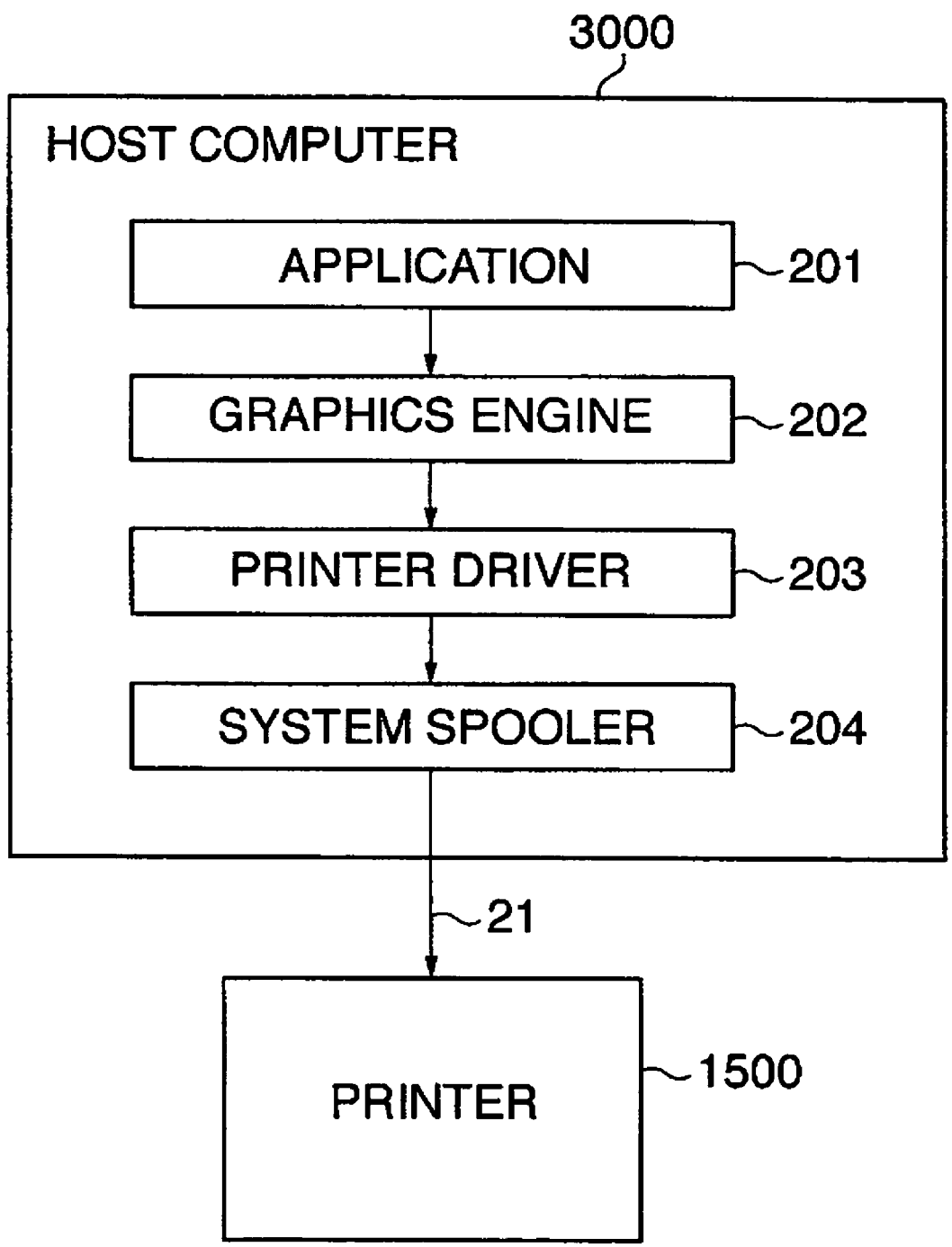
FIG. 2 is a diagram showing program modules executed by a host computer.

FIG. 2 shows program modules executed by the host computer 3000.

An application 201, a graphics engine 202, a printer driver 203, and a system spooler 204 appearing in FIG. 2 exist as files that are stored in the external memory 11, and are loaded into the RAM 2 and executed by the OS or a module. The application 201 and the printer driver 203 can be added to the HD of the external memory 11 by an FD or a CD-ROM or alternatively via a network.

Printing is carried out according to the application 201 using the printer 1500 as follows: The application 201 and the graphic engine 202 stored in the external memory 11 are loaded into the RAM 2. The graphic engine 202 is enabled by being loaded into the RAM 2, and produces image output (image drawing). The graphics engine 202 loads the printer driver 203, which is provided corresponding to the printer 1500, from the external memory 11 into the RAM 2, and the printer driver 203 converts the image outputted from the graphics engine 202 to control commands for the printer 1500. The printer control commands obtained by the conversion are sent to the system spooler 204 loaded into the RAM 2 by the OS, and are outputted from the spooler to the printer 1500 via the interface 21.

Figure 3:
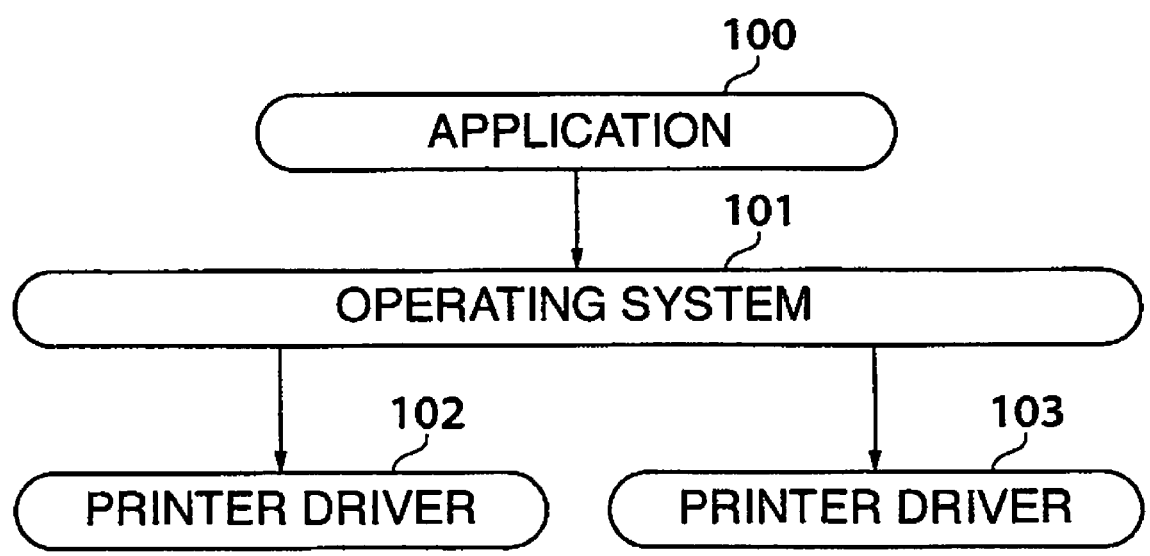
FIG. 3 is a diagram schematically showing a typical relationship between an application and printer drivers of respective printers.

FIG. 3 is a schematic diagram showing a typical relationship between an application and printer drivers of respective printers.

An application 100 carries out a process that calls a variety of functions (APIs) provided by an operating system 101. To implement processing relating to printing, the operating system 101 carries out a process that calls a function (DDI) provided by a printer driver 102 or 103 of the selected printer. As a result, printing to the selected printer can be carried out by the application 100.

Figure 10:
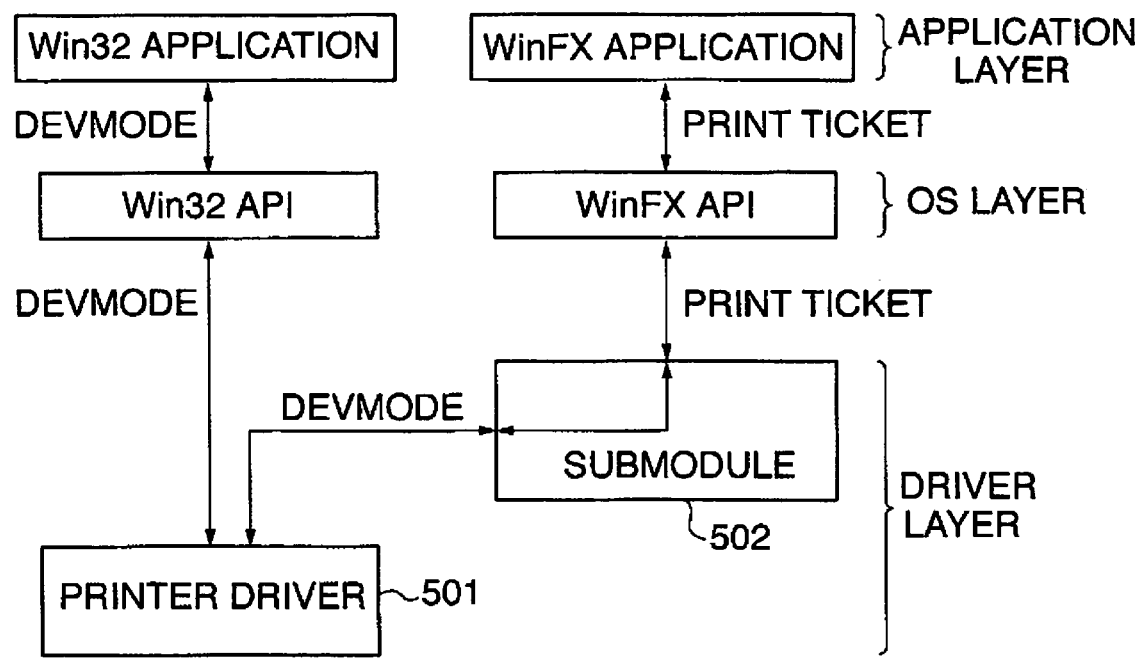
FIG. 10 is a diagram showing how print settings designating data of DEVMODE and the print ticket are exchanged between an application layer, an OS layer, and the driver layer.
Figure 11:
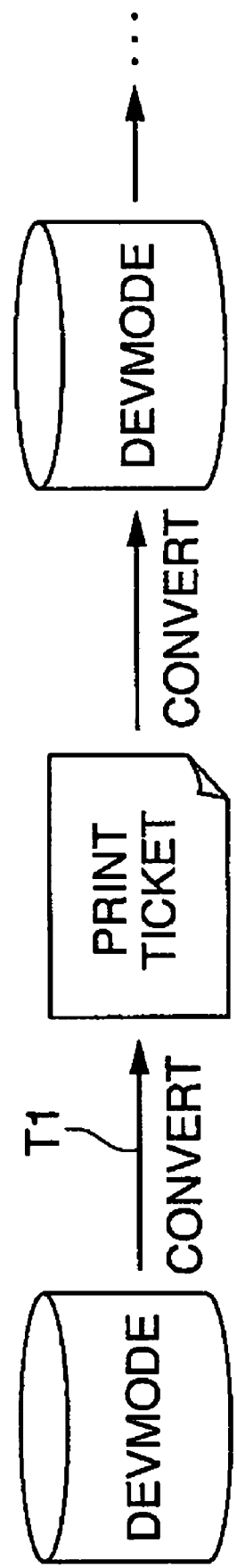
FIG. 11 is a diagram showing a ticket cycle.
Figure 13:
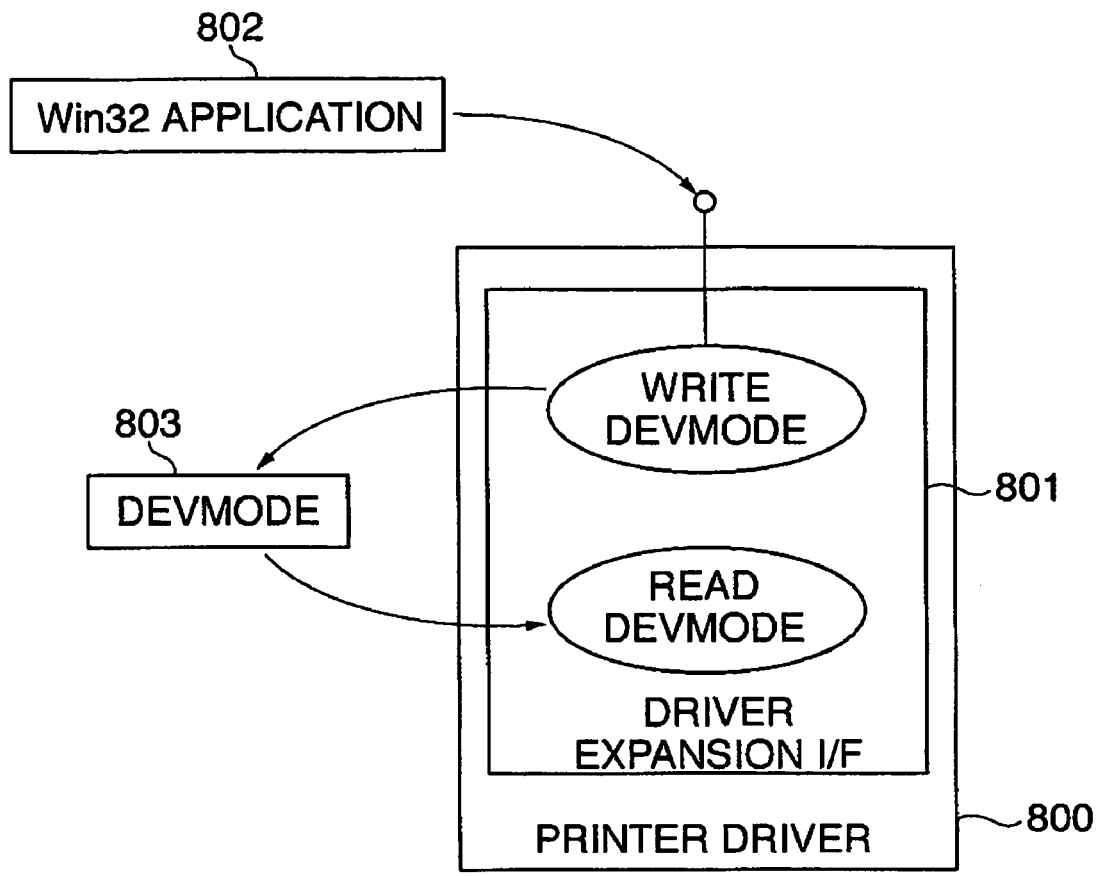
FIG. 13 shows the relationship between a Win32 application and a driver extending interface of a printer driver and the relationship between the driver extending interface and a DEVMODE private portion.

At this time, print settings designating data is exchanged between the printer driver 102 or 103, the operating system 101, and the application 100. Such exchanging of the print settings designating data is shown in FIG. 10. Since FIG. 10 has already been described, description thereof is omitted here.

FIG. 4 is a diagram showing the structure of a DEVMODE structure according to the present embodiment.

In the DEVMODE structure according to the present embodiment, a print ticket 1130 in XML format (a tagged format) is incorporated in a DEVMODE private portion 1120 independently managed by the printer driver. That is, although the DEVMODE structure according to the present embodiment has the appearance of a DEVMODE structure, in reality a print ticket is itself included in the DEVMODE private portion 1120.

In addition to the print ticket 1130, a signature 1101 showing a type of the DEVMODE, a print ticket priority flag 1102 set at "valid" when a written content of the print ticket 1130 has priority over a written content of the DEVMODE public portion 1110, and a print ticket compression flag 1103 set at "valid" when the print ticket is compressed are inserted into the DEVMODE private portion 1120.

In the present embodiment, by using a DEVMODE structure of the above structure, the ticket cycle that occurs in the submodule 502 appearing in FIG. 10 is efficiently carried out (that is, a process that generates the DEVMODE shown in FIG. 4). The detailed processing flow of the ticket cycle will now be described.

Figure 5:
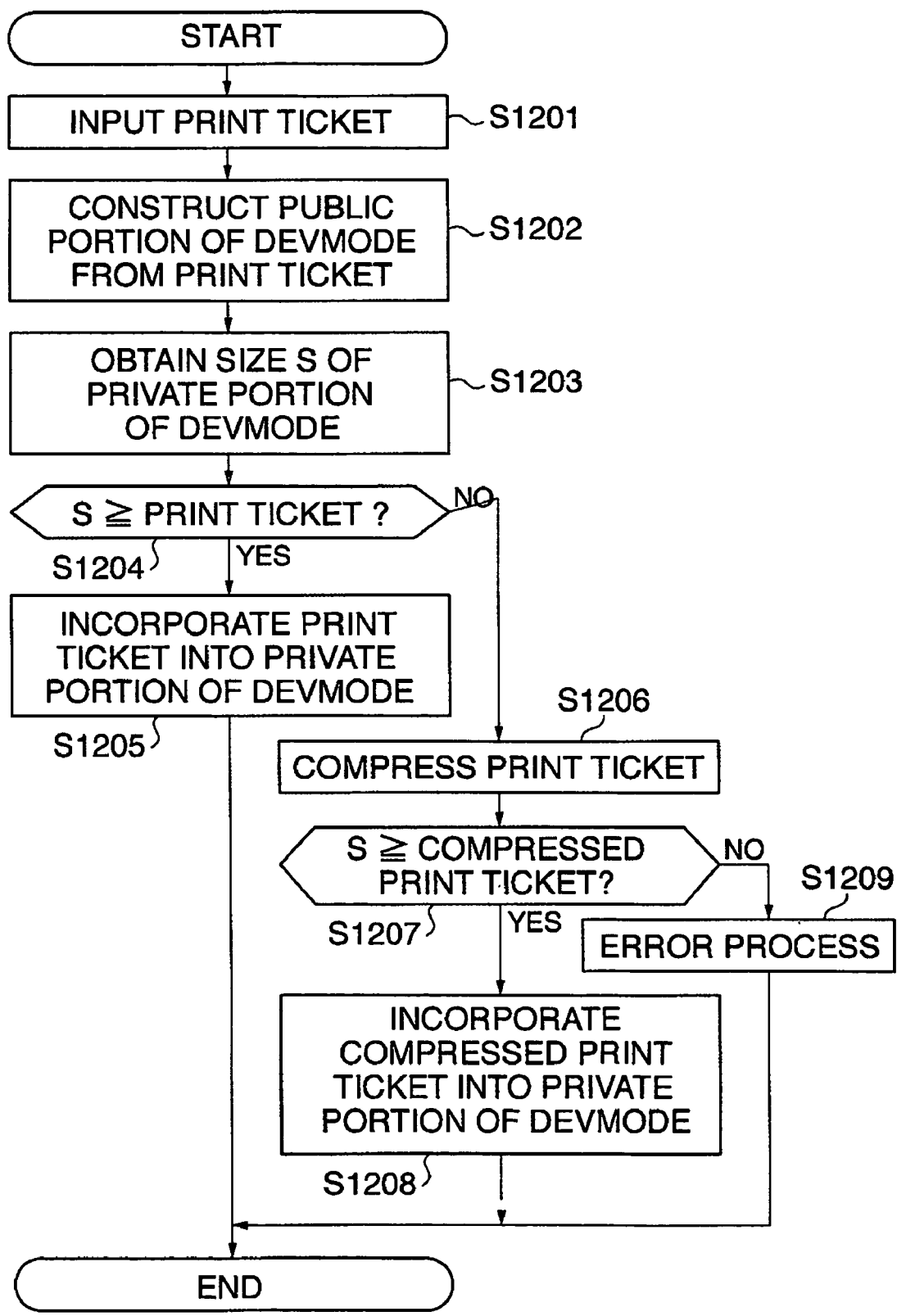
FIG. 5 is a flowchart showing the procedure of a process carried out by a printer driver and a submodule on a driver layer to incorporate a print ticket into the DEVMODE structure.

FIG. 5 is a flowchart showing the procedure of a process carried out by the printer driver 501 and the submodule 502 on the driver layer to incorporate a print ticket into the DEVMODE structure.

First, in a step S1201, the submodule 502 receives a print ticket in XML format that has been inputted from a WinFX application via an API on the OS layer.

In a step S1202, the submodule 502 constructs a public portion 1110 of the DEVMODE structure (hereinafter referred to as DEVMODE public portion 1110) based on various print settings in the XML print ticket. Typically, since the print ticket has a greater ability to express the print settings than the DEVMODE public portion 1110, the processing in the step S1202 is quite simple.

In a step S1203, the submodule 502 acquires a size S of a free space in a memory region used to store the DEVMODE private portion 1120 based on data contained in the "dmDriverExtra" member in the DEVMODE public portion 1110.

In a step S1204, the submodule 502 compares the size S with a size of the print ticket. If the size S is equal to or larger than the size of the print ticket, the process proceeds to a step S1205, while if the size S is smaller than the size of the print ticket, the process proceeds to a step S1206.

In the step S1205, the submodule 502 incorporates the print ticket 1130 into the free space in the DEVMODE private portion 1120. At this time, the submodule 502 sets the signature 1101, sets the print ticket priority flag 1102 at "valid" and sets the print ticket compression flag 1103 at "invalid".

In the step S1206, since all of the data of the print ticket in its original state cannot be incorporated into the DEVMODE private portion 1120, the submodule 502 compresses the data of the print ticket.

In a step S1207, the submodule 502 compares the size S with a size of the print ticket after compression in the step S1206. If the size S is equal to or larger than the size of the compressed print ticket, the process proceeds to a step S1208, while if the size S is smaller than the size of the compressed print ticket, the process proceeds to a step S1209.

In the step S1208, the submodule 502 incorporates the compressed print ticket 1130 into the free space in the DEVMODE private portion 1120. At this time, the submodule 502 sets the signature 1101, sets the print ticket priority flag 1102 at "valid" and sets the print ticket compression flag 1103 at "valid".

In the step S1209, the submodule 502 cancels incorporation of the print ticket in the DEVMODE structure and carries out error handling.

This completes the process incorporating the print ticket into the DEVMODE structure.

Figure 6:
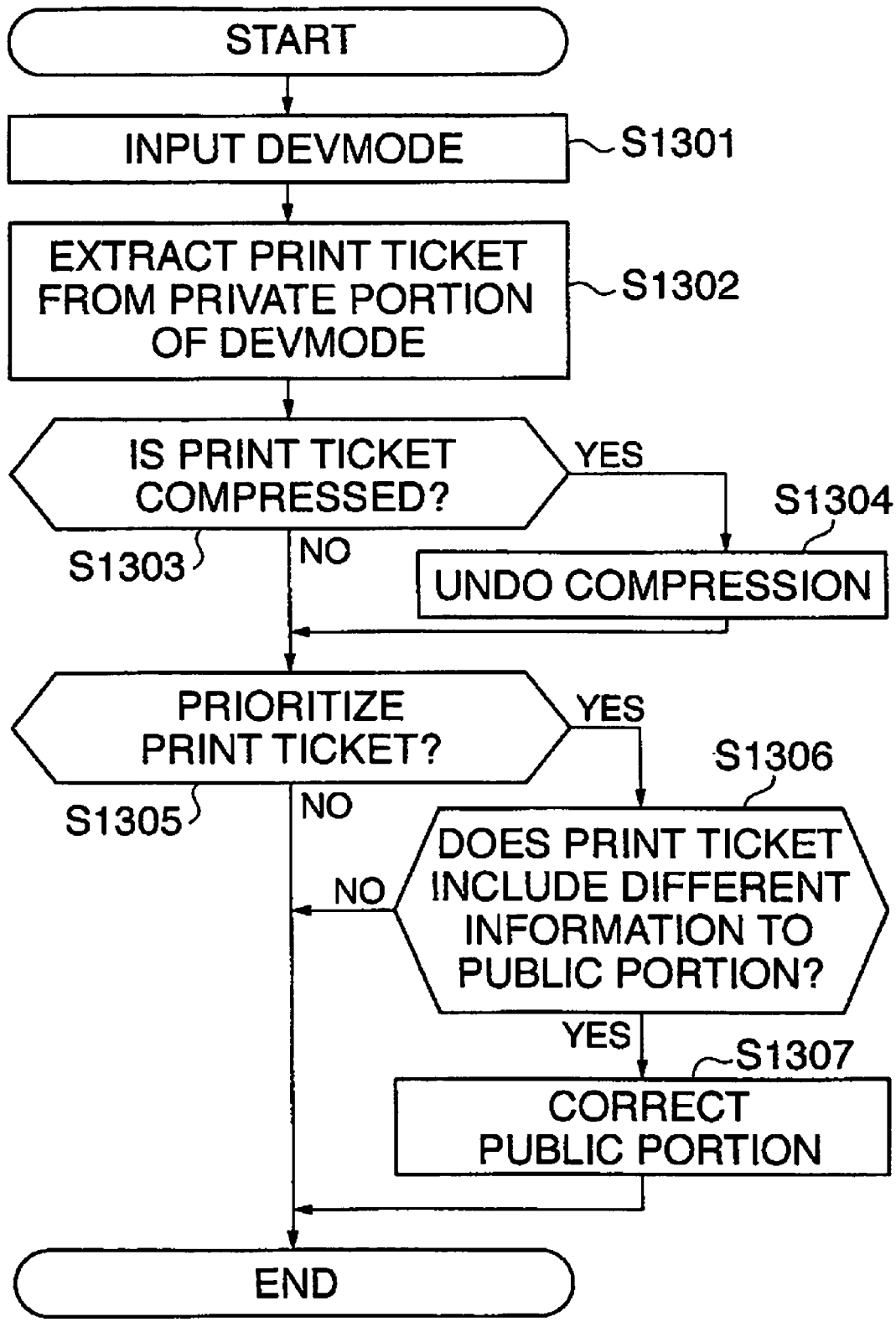
FIG. 6 is a flowchart showing the procedure of a process executed by the printer driver and the submodule on the driver layer to extract the print ticket from the DEVMODE structure.

FIG. 6 is a flowchart showing the procedure of a process executed by the printer driver 501 and the submodule 502 on the driver layer to extract the print ticket from the DEVMODE structure. This process occurs when a WinFX application has requested DEVMODE print settings managed by the printer driver 501.

In a step S1301, DEVMODE is inputted from the printer driver 501 into the submodule 502.

In a step S1302, the submodule 502 extracts the print ticket 1130 from the DEVMODE private portion 1120.

In a step S1303, the submodule 502 refers to the print ticket compression flag 1103 and determines whether the print ticket compression flag 1103 is set at "valid", that is, whether the print ticket is compressed. If the print ticket compression flag 1103 is set at "valid", the process proceeds to a step S1304, while if the print ticket compression flag 1103 is not set at "valid", the process skips the step S1304 and proceeds to a step S1305.

In the step S1304, since the print ticket obtained in the step S1302 is compressed, the compressed print ticket is decompressed.

In the step S1305, the submodule 502 determines whether the print ticket priority flag 1102 is set at "valid", that is, settings in the print ticket 1130 has priority over settings in the DEVMODE public portion 1110. If the print ticket priority flag 1102 is set at "valid", the process proceeds to a step S1306, while if the print ticket compression flag 1103 is not set at "valid", the present process is terminated.

In the step S1306, the submodule 502 compares the settings in the print ticket 1130 obtained in the step S1302 or the step S1304 with the settings in the DEVMODE public portion 1110. If the print ticket includes information that differs to the settings in the DEVMODE public portion 1110, the processing proceeds to a step S1307, while if there is no such information, the present process is terminated.

In a step S1307, the submodule 502 corrects the content of the settings of the print ticket 1130 obtained in the step S1302 or the step S1304 so as to match the settings in the DEVMODE public portion 1110.

This completes extraction of the print ticket from the DEVMODE structure.

It should be noted that the process shown in FIG. 5 that incorporates the print ticket in the DEVMODE structure and the process shown in FIG. 6 that extracts the print ticket from the DEVMODE structure, which are executed by the printer driver 501 and the submodule 502, are extremely simple. Thus, it is easy to have a Win32 application that supports an API for handling the DEVMODE structure (an independent API for the private portion) to carry out the incorporating process and the extracting process. This will now be described with reference to FIG. 7.

Figure 7:
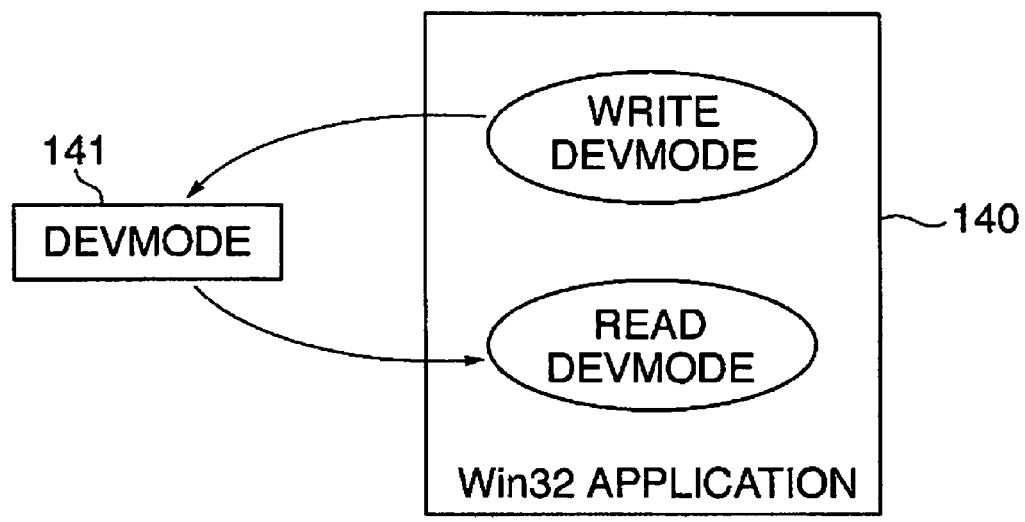
FIG. 7 is a diagram showing a Win32 application capable of directly reading and writing the DEVMODE structure with incorporated print ticket according to the present embodiment.
Figure 8:
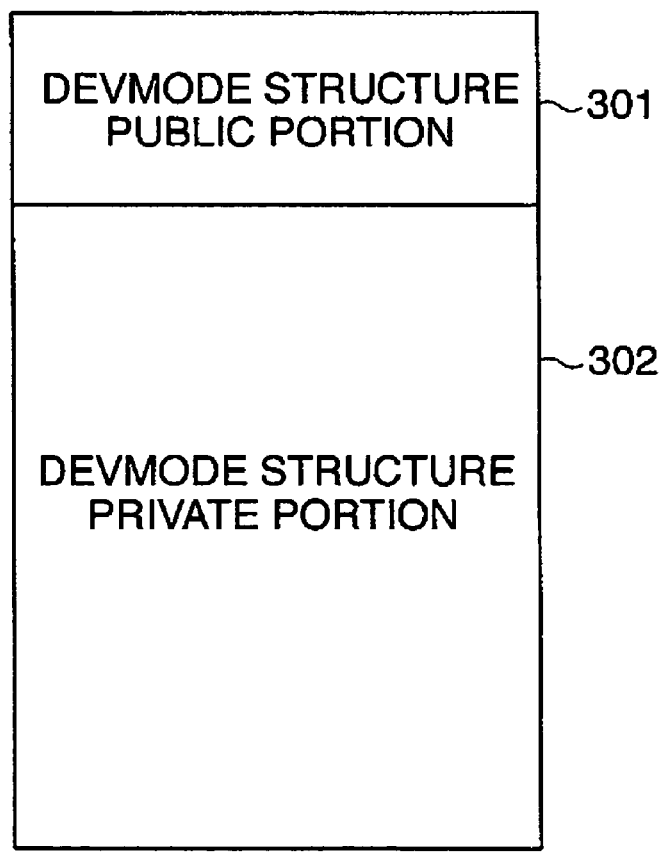
FIG. 8 is a diagram showing the overall structure of the DEVMODE structure.

FIG. 7 is a diagram showing a Win32 application 140 capable of directly reading and writing a DEVMODE structure 141 with an incorporated print ticket (one example of which is shown in FIG. 4) according to the present embodiment. It is assumed that the Win32 application 140 can execute the process shown in FIG. 5 that incorporates the print ticket in the DEVMODE structure and the process shown in FIG. 6 that extracts the print ticket from the DEVMODE structure.

Figure 14:
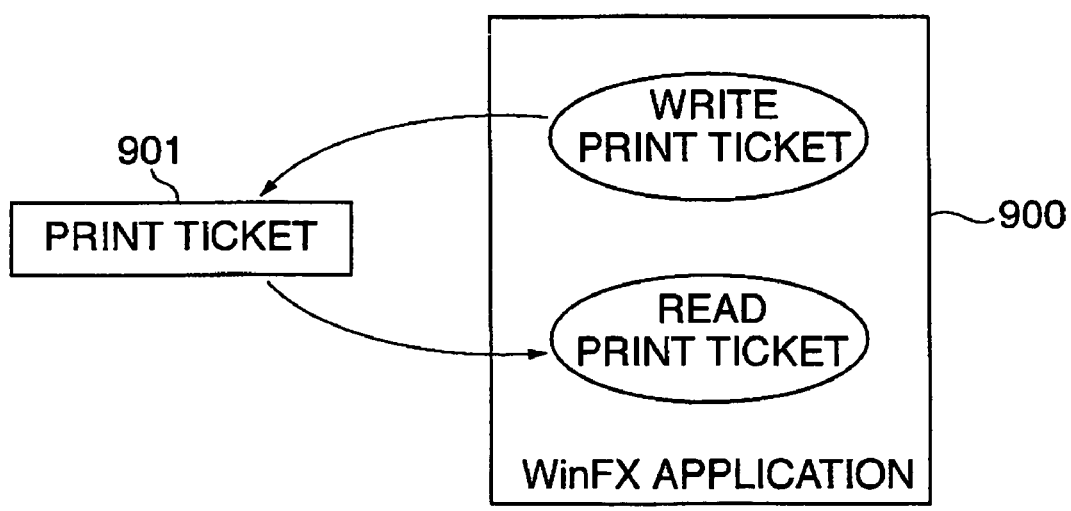
FIG. 14 is a diagram showing the relationship between a WinFX application and a print ticket.

By executing the process shown in FIG. 5 that incorporates the print ticket in the DEVMODE structure, the Win32 application 140 can incorporate a print ticket in a DEVMODE structure to produce the DEVMODE structure 141 (one example of which is shown in FIG. 4) in which the print ticket is incorporated. In the same way, by executing the process shown in FIG. 6 that extracts the print ticket from the DEVMODE structure, the Win32 application 140 recognizes that the signature 1101 (shown in FIG. 4) is set in the DEVMODE structure 141 and therefore determines that the DEVMODE structure 141 is a DEVMODE structure in which a print ticket is incorporated. As a result, the Win32 application 140 can directly read and write the DEVMODE structure 141 in the same way as the relationship between the WinFX application 900 and the print ticket 901 shown in FIG. 14.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read out from the storage medium realizes the functions of the above described embodiment, and hence the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

This application claims the benefit of Japanese Application No. 2005-107919, filed Apr. 4, 2005, which is hereby incorporated by reference herein in its entirety.

What is claimed is:

1. A print control apparatus on which operates an application that handles print settings as a print ticket in XML format, the print control apparatus comprising:
   a generating device that generates a print settings structure composed of a public data portion in binary format constructed based on the print ticket in XML format and a non-public data portion in which the print ticket in XML format is incorporated; and
   an insertion device that inserts identification information indicating that the print ticket is included in the non-public data portion, in the print setting structure generated by said generating device.

2. A print control apparatus according to claim 1, wherein said generating device includes:
   an acquiring device that acquires a size of a free space in a memory region for storing the non-public data portion of the print settings structure in binary format;
   a first comparing device that compares the size of the free space acquired by said acquiring device and a size of the print ticket in XML format; and
   a compressing device operable when a comparison result of said first comparing device is that the size of the free space is smaller than the size of the print ticket in XML format, to compress the print ticket in XML format.

3. A print control apparatus according to claim 2, wherein said generating device includes:
   a second comparing device that compares the size of the free space acquired by said acquiring device and a size of the print ticket in XML format compressed by said compressing device; and
   a first storage device operable when a comparison result of said second comparing device is that the size of the compressed print ticket in XML format is not greater than the size of the free space, to store the compressed print ticket in XML format in the free space in the memory region for storing the non-public data portion of the print settings structure in binary format.

4. A print control apparatus according to claim 2, wherein said generating device includes a second storage device operable when a comparison result of said first comparing device is that the size of the free space is not less than the size of the print ticket in XML format, to store the print ticket in XML format in the free space in the memory region for storing the non-public data portion of the print settings structure in binary format.

5. A print control apparatus according to claim 3, wherein said generating device includes a canceling device operable when a comparison result of said second comparing device is that the size of the compressed print ticket in XML format is larger than the size of the free space, to cancel storage of the compressed print ticket in XML format in the free space in the memory region for storing the non-public data portion of the print settings structure in binary format.

6. A print control apparatus according to claim 1, further comprising:
   a deciding device that decides which data is to be prioritized out of the print ticket in XML format and the public data portion of the print settings structure in binary format;
   a determining device operable when said deciding device has decided that the print ticket in XML format is to be prioritized, to determine whether a content of the print ticket in XML format differs to a content of the public data portion of the print settings structure in binary format; and
   a correcting device operable when said determining device has determined that the content of the print ticket in XML format differs from the content of the public data portion of the print settings structure in binary format, to correct the print ticket in XML format based on the content of the public data portion of the print settings structure in binary format.

7. A print control method applied to a print control apparatus on which operates an application that handles print settings as a print ticket in XML format, the print control method comprising:
   a generating step of generating a print settings structure composed of a public data portion in binary format constructed based on the print ticket in XML format and a non-public data portion in which the print ticket in XML format is incorporated; and;
   an insertion step of inserting identification information indicating that the print ticket is included in the non-public data portion, in the print setting structure generated in said generating step.

8. A print control method according to claim 7, wherein said generating step includes:
   an acquiring step of acquiring a size of a free space in a memory region for storing the non-public data portion of the print settings structure in binary format;
   a first comparing step of comparing the size of the free space acquired by said acquiring step and a size of the print ticket in XML format; and
   a compressing step of compressing the print ticket in XML format when a comparison result of said first comparing step is that the size of the free space is smaller than the size of the print ticket in XML format.

9. A print control method according to claim 8, wherein said generating step includes:
   a second comparing step of comparing the size of the free space acquired by said acquiring step and a size of the print ticket in XML format compressed by said compressing step; and
   a first storage step of storing the compressed print ticket in XML format in the free space in the memory region for storing the non-public data portion of the print settings structure in binary format when a comparison result of said second comparing step is that the size of the compressed print ticket in XML format is not greater than the size of the free space.

10. A print control method according to claim 8, wherein said generating step includes a second storage step of storing the print ticket in XML format in the free space in the memory region for storing the non-public data portion of the print settings structure in binary format when a comparison result of said first comparing step is that the size of the free space is not less than the size of the print ticket in XML format.

11. A print control method according to claim 9, wherein said generating step includes a canceling step of canceling storage of the compressed print ticket in XML format in the free space in the memory region for storing the non-public data portion of the print settings structure in binary format when a comparison result of said second comparing step is that the size of the compressed print ticket in XML format is larger than the size of the free space.

12. A print control method according to claim 7, further comprising:
- a deciding step of deciding which data is to be prioritized out of the print ticket in XML format and the public data portion of the print settings structure in binary format;
- a determining step of determining whether a content of the print ticket in XML format differs to a content of the public data portion of the print settings structure in binary format when said deciding step has decided that the print ticket in XML format is to be prioritized; and
- a correcting step of correcting the print ticket in XML format based on the content of public data portion of the print settings structure in binary format when said determining step has determined that the print ticket in XML format differs from the content of the public data portion of the print settings structure in binary format.

13. A non-transitory computer-readable storage medium storing a program that, when executed by a computer, causes the computer to implement a print control method applied to a print control apparatus on which operates an application that handles print settings as a print ticket in XML format, the program comprising:
- a generating module for generating a print settings structure composed of a public data portion in binary format constructed based on the print ticket in XML format and a non-public data portion in which the print ticket in XML format is incorporated; and
- an insertion module for inserting identification information indicating that the print ticket is included in the non-public data portion, in the print setting structure generated by said generating module.

* * * * *